G. Fowler,
Force Pump.
N° 12,312.    Patented Jan. 30, 1855.

UNITED STATES PATENT OFFICE.

GEORGE FOWLER, OF NORTHFORD, CONNECTICUT.

DOUBLE-ACTING FORCE-PUMP.

Specification of Letters Patent No. 12,312, dated January 30, 1855.

*To all whom it may concern:*

Be it known that I, GEORGE FOWLER, of Northford, in the county of New Haven and State of Connecticut, have invented a new and useful Improvement in Lifting-Pumps; and I do hereby declare that the following is a full, clear, and exact description of the construction, character, and operation of the same, reference being had to the accompanying drawings, which make a part of this specification, in which—

Figure 1:
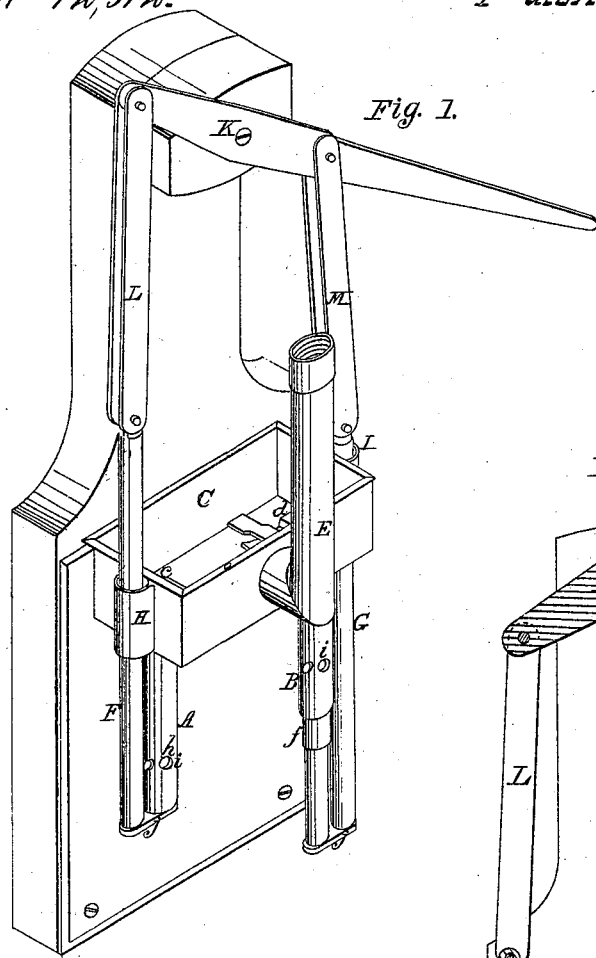
Figure 2:
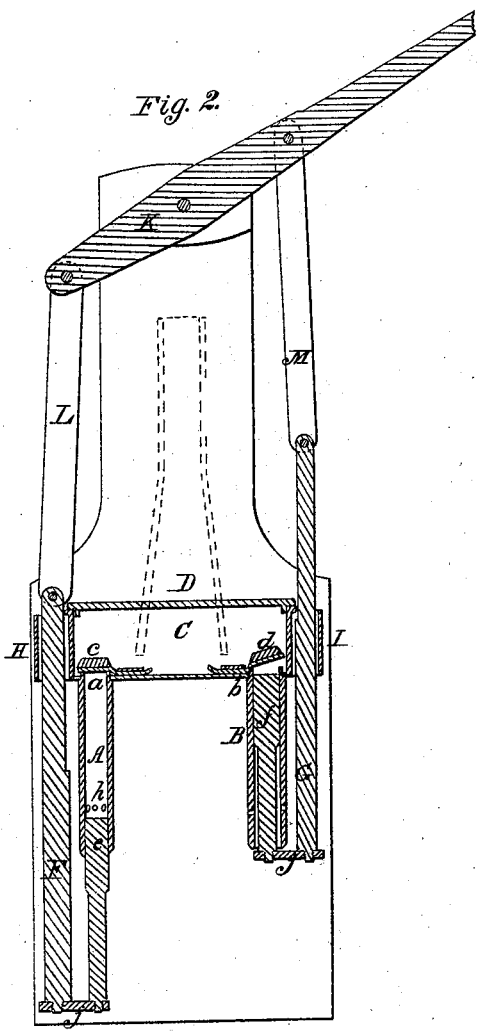
Figure 3:
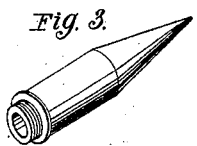

Figure 1 is a perspective view of a double acting lifting pump, showing all its external parts, as ready for use. Fig. 2, is a vertical section of the same, cut through its center, showing all the internal structures in their proper positions. Fig. 3, is a perspective view of the end, or mouth piece of the water pipe E, Fig. 1.

My improvement consists in so constructing the pump, (either single, or double, acting) that the water will be let into the pump stock, or cylinder, above the piston, so that the piston will not need any valve, it being worked, to lift the water, by a rod, or shaft, outside of the pump stock, leaving the whole space in the cylinder to be filled with water, thereby raising a greater quantity of water in proportion to the size of the cylinder and the piston being solid will be much less liable to get out of order, while the only valve, which is used, is in the upper reservoir, where it can be readily examined by simply unscrewing the lid.

I make the pump stock, A, B, Fig. 1, of a hollow cylinder, of any suitable material, open at both ends, as shown, in section at A, B, Fig. 2, and secure the upper end, $a$, $b$, in the bottom of a suitable reservoir, C (which serves both as water vessel, and air vessel,) the upper end of the cylinder passing completely through the bottom, as seen at $a$, $b$, Fig. 2. And the lower part perforated with holes, as seen at $h$, $i$, Fig. 1. In the bottom of the reservoir, C, I fit a suitable valve, as seen at $c$, $d$, Fig. 2, to close the upper end of the cylinder, the valve opening upward to admit the water into the reservoir, and closing by its own gravity, or the pressure of the water in the reservoir.

I make the reservoir of cast iron, or any other suitable material, and render it air tight by screwing down the lid, D, Fig. 2, with suitable packing. And, to the side of this reservoir, C, I fit a suitable pipe, as E, Fig. 1, to which may be attached any desired length of pipe, or hose, to convey the water to the desired locality. Or, this pipe may be attached to the lid, and be extended down to near the bottom of the reservoir, (leaving sufficient space for air,) as indicated by dots, at D, Fig. 2.

I make the piston, $e$, $f$, of solid cast iron, or any other suitable material, (without boxes or valves,) to accurately fit the inside of the cylinder, as seen at $e$, $f$, Fig. 2, so that no packing will, ordinarily, be necessary, (but they may be packed in any of the ordinary ways, if thought necessary). The rod and piston, together, should be about the length of the cylinder, as shown at $f$, Fig. 2.

I connect the lower end of the piston, (by means of a cross bar $j$,) with the side rod, or shaft, F, G. This side rod, F, G, is caused to work parallel with the piston rod, $h$, $i$, by means of the guide, H, I, attached to the reservoir C. I connect the upper end of the parallel side rod, F, G, with the lever, or brake, K, by means of the connecting rod, or bar, L, M.

Having constructed the parts as above described, I connect the lower ends of the piston, and side, rods, insert the piston into the lower end of the cylinder, and the side rod through the guide, and connect its upper end with the lever, or brake, when the pump is ready for use. The lower end of the cylinder, &c., is put into the water to a depth greater than to the holes, $h$, $i$, so that when the piston is forced down to the position seen at $e$, Fig. 2, the water will rush into the holes, at $h$, and when the piston is forced up, it will lift the water upon its upper end, force open the valve, as at $d$, Fig. 2, and force the whole column of water into the reservoir, C, when the pressure of the air (in the reservoir,) upon the water will force it out through the pipe, E, and convey it to any desired place, by means of additional pipe, or hose, to the extreme end of which, should be attached the pipe, or mouth piece, Fig. 3, or some other suitable termination.

This pump can, very advantageously, be made double acting, as shown in Figs. 1 and 2. And, when set very deep in the water, there may be valves opening inward, near the top of the water, to prevent the resistance of the vacuum while the piston is descending. This pump will be equally suitable for fire-engines, or, in any situation where lifting or forcing pumps are required.

What I claim as my invention, and desire to secure by Letters Patent, is—

The combination of the solid piston with the cylinder, and reservoir, when the piston is inserted from the lower end of the cylinder, and worked by a parallel side, rod, or shaft, outside of the cylinder, (whether for single, or double, acting pumps,) so as to constitute it an efficient lifting pump, (without suction valves,) and the whole is constructed, combined, and arranged, substantially, as herein set forth.

GEORGE FOWLER.

Witnesses:
SAMUEL THOMPSON,
R. FITZGERALD.